US012253235B2

(12) United States Patent
Imura

(10) Patent No.: US 12,253,235 B2
(45) Date of Patent: Mar. 18, 2025

(54) VEHICULAR LAMP FITTING AND LIGHT GUIDING BODY

(71) Applicant: STANLEY ELECTRIC CO., LTD., Tokyo (JP)

(72) Inventor: Ryohei Imura, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/621,295

(22) Filed: Mar. 29, 2024

(65) Prior Publication Data

US 2024/0328591 A1 Oct. 3, 2024

(30) Foreign Application Priority Data

Mar. 29, 2023 (JP) ................................ 2023-053830

(51) Int. Cl.

*F21S 43/237* (2018.01)
*F21S 43/247* (2018.01)
*F21S 43/50* (2018.01)

(52) U.S. Cl.

CPC ........... *F21S 43/237* (2018.01); *F21S 43/247* (2018.01); *F21S 43/51* (2018.01)

(58) Field of Classification Search

CPC ...... F21S 43/241; F21S 43/237; F21S 43/247; F21S 43/51; G02B 6/0008; G02B 6/006

See application file for complete search history.

(56) References Cited

FOREIGN PATENT DOCUMENTS

| | | | |
|---|---|---|---|
| FR | 3042258 | A1 * | 4/2017 |
| JP | 2013-110047 | A | 6/2013 |
| JP | 2017-041368 | A | 2/2017 |

OTHER PUBLICATIONS

English machine translation of FR 3042258A1 (Year: 2017).*

* cited by examiner

*Primary Examiner* — Anne M Hines

(74) *Attorney, Agent, or Firm* — KENEALY VAIDYA LLP

(57) ABSTRACT

A vehicular lamp fitting according to the present invention comprises: a light guiding body; a first light source; and a second light source, wherein the light guiding body includes a first rod-shaped light guiding portion which guides first light emitted by the first light source, a second rod-shaped light guiding portion which guides second light emitted by the second light source, an intermediate portion which is arranged between the first rod-shaped light guiding portion and the second rod-shaped light guiding portion, a first coupling portion which couples a base end portion side of the first rod-shaped light guiding portion and the intermediate portion together such that a part of the first light, which enters the first rod-shaped light guiding portion through a light entering surface of the first rod-shaped light guiding portion, enters an inside of the intermediate portion.

8 Claims, 5 Drawing Sheets

VEHICULAR LAMP FITTING AND LIGHT GUIDING BODY

INCORPORATION BY REFERENCE

This application is based upon and claims the benefit of priority from Japanese patent application No. 2023-53830, filed on Mar. 29, 2023, the disclosure of which is incorporated herein in its entirety by reference.

BACKGROUND

The present disclosure relates to a vehicular lamp fitting and a light guiding body.

A vehicular lamp fitting has been known which uses a light source and a rod-shaped light guiding portion guiding light emitted by the light source (for example, see Japanese Unexamined Patent Application Publication No. 2013-110047).

SUMMARY

However, in a vehicular lamp fitting disclosed in Japanese Unexamined Patent Application Publication No. 2013-110047, there has been a problem that in a case of using a plurality of combinations of a light source and a rod-shaped light guiding portion guiding light emitted by the light source, depending arrangement of the rod-shaped light guiding portions, the distance between the rod-shaped light guiding portions (light emitting surfaces) cannot satisfy a single-lamp requirement (the distance between the light emitting surfaces is 75 mm or less) which is provided by laws.

The present disclosure has been made to solve such a problem, and an object thereof is to provide a vehicular lamp fitting and a light guiding body that can satisfy the single-lamp requirement (the distance between the light emitting surfaces is 75 mm or less) which is provided by laws.

A vehicular lamp fitting according to the present invention comprises: a light guiding body; a first light source; and a second light source, wherein the light guiding body includes a first rod-shaped light guiding portion which guides first light emitted by the first light source, a second rod-shaped light guiding portion which guides second light emitted by the second light source, an intermediate portion which is arranged between the first rod-shaped light guiding portion and the second rod-shaped light guiding portion, a first coupling portion which couples a base end portion side of the first rod-shaped light guiding portion and the intermediate portion together such that a part of the first light, which enters the first rod-shaped light guiding portion through a light entering surface of the first rod-shaped light guiding portion, enters an inside of the intermediate portion, and a second coupling portion which couples a base end portion side of the second rod-shaped light guiding portion and the intermediate portion together such that a part of the second light, which enters the second rod-shaped light guiding portion through a light entering surface of the second rod-shaped light guiding portion, enters the inside of the intermediate portion, and the intermediate portion includes a light exiting surface from which the first light and the second light, which enter the inside of the intermediate portion, exit.

In such a configuration, the single-lamp requirement (the distance between the light emitting surfaces is 75 mm or less) which is provided by laws can be satisfied.

This is because the intermediate portion forming the light emitting surface is arranged between the first rod-shaped light guiding portion and the second rod-shaped light guiding portion.

Further, in the above-described vehicular lamp fitting, the vehicular lamp fitting may comprise a decorative member in which a slit-shaped through hole, through which light exiting from the light exiting surface of the intermediate portion passes, is formed.

Further, in the above-described vehicular lamp fitting, the vehicular lamp fitting may comprise a light guiding portion which is arranged between the light exiting surface of the intermediate portion and the slit-shaped through hole and which guides the light exiting from the light exiting surface of the intermediate portion to the slit-shaped through hole.

A light guiding body according to the present invention comprises: a first rod-shaped light guiding portion which guides first light emitted by a first light source, a second rod-shaped light guiding portion which guides second light emitted by a second light source, an intermediate portion which is arranged between the first rod-shaped light guiding portion and the second rod-shaped light guiding portion, a first coupling portion which couples a base end portion side of the first rod-shaped light guiding portion and the intermediate portion together such that a part of the first light, which enters the first rod-shaped light guiding portion through a light entering surface of the first rod-shaped light guiding portion, enters an inside of the intermediate portion, and a second coupling portion which couples a base end portion side of the second rod-shaped light guiding portion and the intermediate portion together such that a part of the second light, which enters the second rod-shaped light guiding portion through a light entering surface of the second rod-shaped light guiding portion, enters the inside of the intermediate portion, and the intermediate portion includes a light exiting surface from which the first light and the second light, which enter the inside of the intermediate portion, exit.

In such a configuration, the single-lamp requirement (the distance between the light emitting surfaces is 75 mm or less) which is provided by laws can be satisfied.

This is because the intermediate portion forming the light emitting surface is arranged between the first rod-shaped light guiding portion and the second rod-shaped light guiding portion.

The present disclosure can provide the vehicular lamp fitting and the light guiding body that can satisfy the single-lamp requirement (the distance between the light emitting surfaces is 75 mm or less) which is provided by laws.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
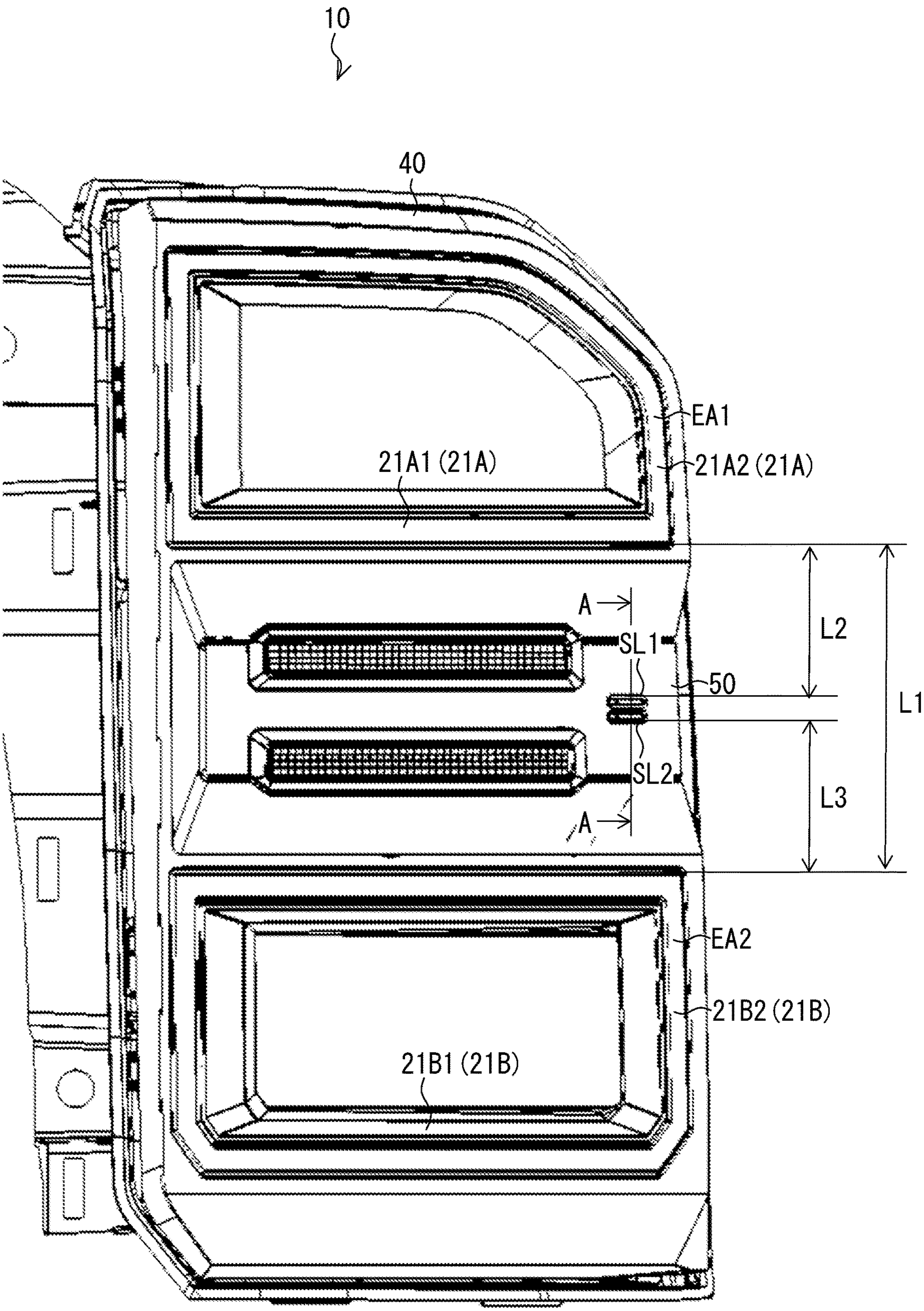
FIG. 1 is a front view of the vehicular lamp fitting 10.

A vehicular lamp fitting 10 as an embodiment of the present disclosure will hereinafter be described with reference to the attached drawings. In the drawings, the same reference characters will be given to corresponding configuration elements, and descriptions thereof will not be repeated.

The vehicular lamp fitting 10 of the present embodiment is a vehicle signal lighting tool which functions as a tail lamp and is mounted on each of both of left and right sides of a rear end portion of a vehicle (not illustrated) such as an automobile. Because the vehicular lamp fittings 10 mounted on both of left and right sides have a left-right symmetric configuration, in the following, a description will be made about, as a representative, the vehicular lamp fitting 10 mounted on the right side (the right side relative to vehicle front) of the rear end portion of the vehicle.

Figure 2A:
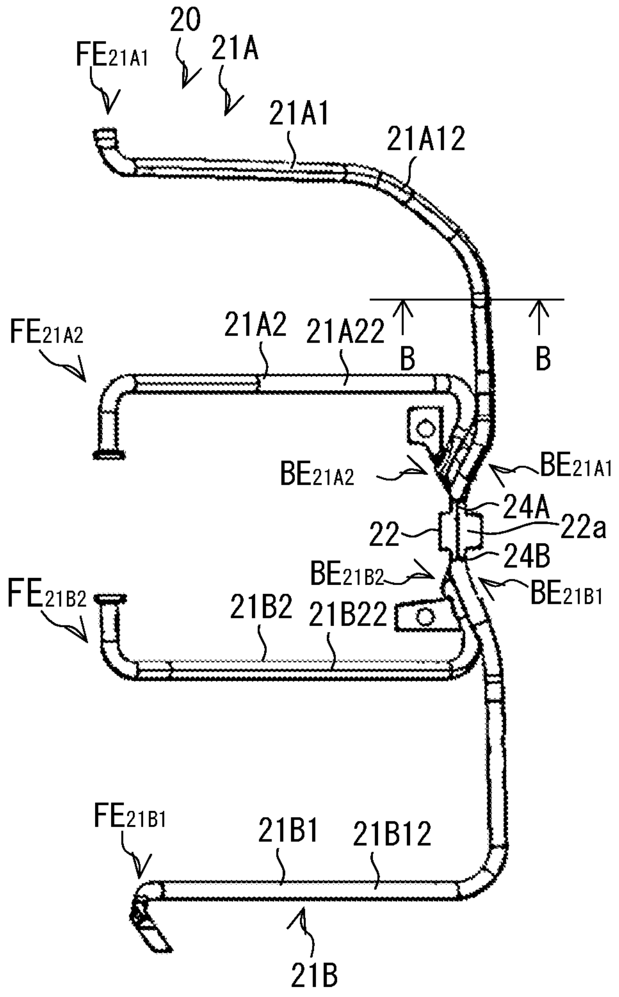
FIG. 2A is a front view of a light guiding body 20 extracted from FIG. 1.
Figure 2B:
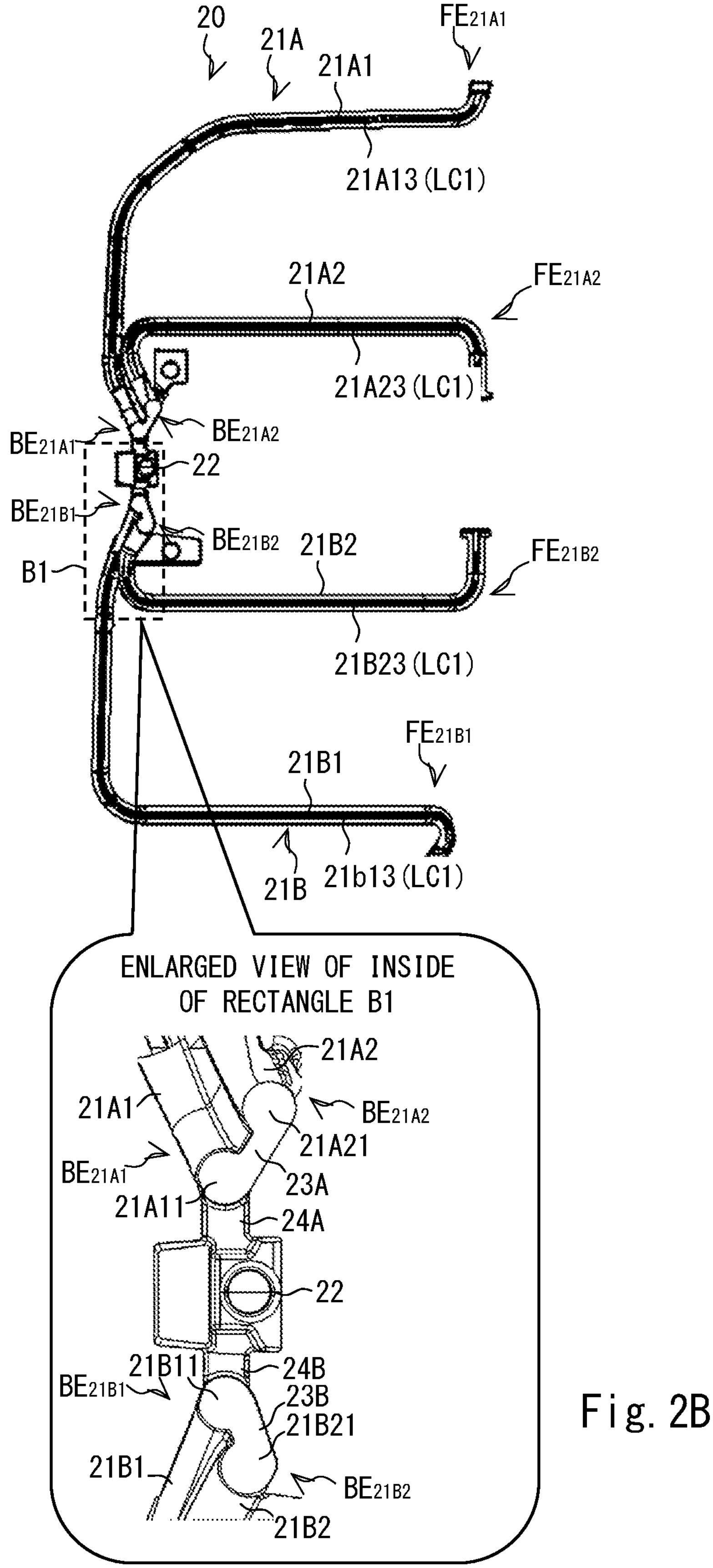
FIG. 2B is its rear view.
Figure 3:
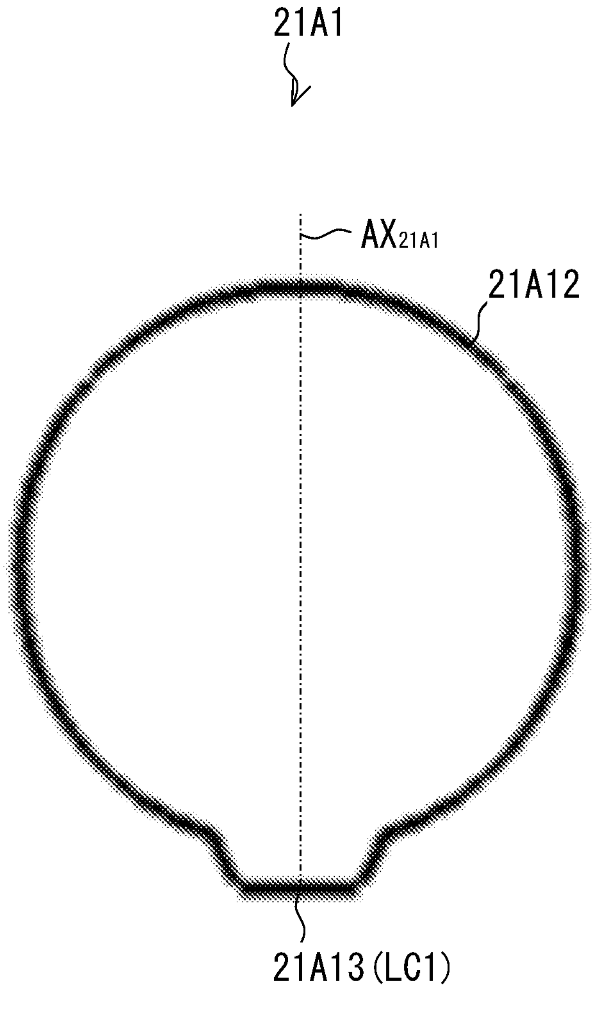
FIG. 3 is a cross-sectional view taken along B-B in FIG. 2A.
Figure 4:
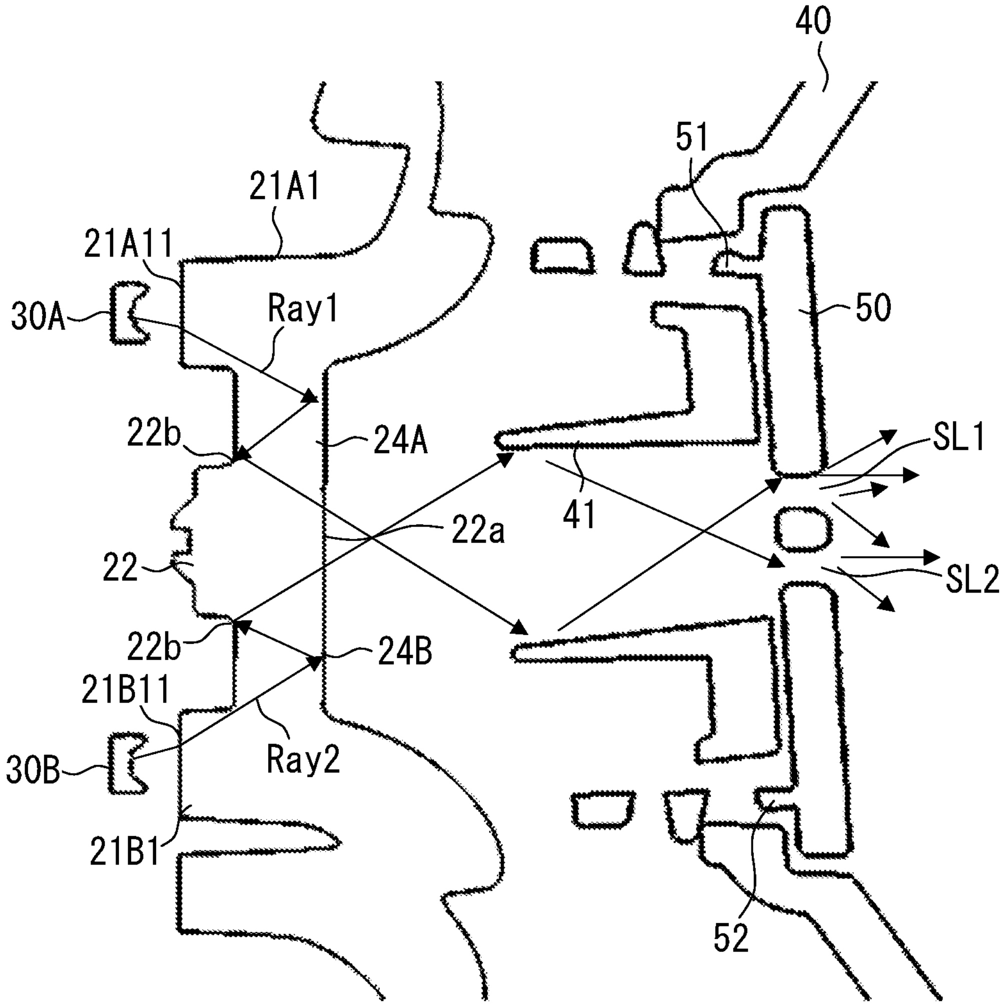
FIG. 4 is a cross-sectional view taken along A-A in FIG. 1.

FIG. 1 is a front view of the vehicular lamp fitting 10. FIG. 2A is a front view of a light guiding body 20 extracted from FIG. 1, and FIG. 2B is its rear view. FIG. 3 is a cross-sectional view taken along B-B in FIG. 2A. FIG. 4 is a cross-sectional view taken along A-A in FIG. 1.

As illustrated in FIG. 1 to FIG. 4, the vehicular lamp fitting 10 includes the light guiding body 20, a first light source 30A, a second light source 30B, a first extension 40, and a second extension 50. Although no illustration is provided, the vehicular lamp fitting 10 is arranged in a lamp chamber configured with an outer lens and a housing and is attached to the housing or the like.

The light guiding body 20 is formed of a transparent resin such as an acrylic resin or a polycarbonate and, as illustrated in FIG. 2A, includes an upper-side rod-shaped light guiding portion 21A, a lower-side rod-shaped light guiding portion 21B, and an intermediate portion 22 which is arranged between the upper-side rod-shaped light guiding portion 21A and the lower-side rod-shaped light guiding portion 21B. The rod-shaped light guiding portion will also be referred to as a light guiding rod.

The upper-side rod-shaped light guiding portion 21A includes rod-shaped light guiding portions 21A1 and 21A2. Similarly, the lower-side rod-shaped light guiding portion 21B includes rod-shaped light guiding portions 21B1 and 21B2. In the following, the rod-shaped light guiding portion 21A1 will be denoted as a first rod-shaped light guiding portion 21A1. The rod-shaped light guiding portion 21B1 will be denoted as a second rod-shaped light guiding portion 21B1. The rod-shaped light guiding portion 21A2 will be denoted as a third rod-shaped light guiding portion 21A2. The rod-shaped light guiding portion 21B2 will be denoted as a fourth rod-shaped light guiding portion 21B2. In a case where the rod-shaped light guiding portions 21A1, 21A2, 21B1, and 21B2 are not particularly distinguished, each of those will simply be denoted as the rod-shaped light guiding portion 21.

As illustrated in FIG. 4, the first rod-shaped light guiding portion 21A1 guides light which is emitted by the first light source 30A (hereinafter, denoted as first light), the first light source 30A being arranged to be opposed to a light entering surface 21A11 of the first rod-shaped light guiding portion 21A1. As illustrated in FIG. 2A and FIG. 2B, the first rod-shaped light guiding portion 21A1 is a long light guiding rod, which guides the first light entering from the light entering surface 21A11 as an end surface on a base end portion $BE_{21A1}$ side to a distal end portion $FE_{21A1}$ side, and is configured to have a curved shape corresponding to a part of a ring-shaped light emitting surface (see a ring-shaped region indicated by a character EA1 in FIG. 1).

Similarly, as illustrated in FIG. 4, the second rod-shaped light guiding portion 21B1 guides light which is emitted by the second light source 30B (hereinafter, denoted as second light), the second light source 30B being arranged to be opposed to a light entering surface 21B11 of the second rod-shaped light guiding portion 21B1. As illustrated in FIG. 2A and FIG. 2B, the second rod-shaped light guiding portion 21B1 is a long light guiding rod, which guides the second light entering from the light entering surface 21B11 as an end surface on a base end portion $BE_{21B1}$ side to a distal end portion $FE_{21B1}$ side, and is configured to have a curved shape corresponding to a part of a ring-shaped light emitting surface (see a ring-shaped region indicated by a character EA2 in FIG. 1).

Similarly, the third rod-shaped light guiding portion 21A2 guides light which is emitted by a third light source (not illustrated), the third light source being arranged to be opposed to a light entering surface 21A21 of the third rod-shaped light guiding portion 21A2. As illustrated in FIG. 2A and FIG. 2B, the third rod-shaped light guiding portion 21A2 is a long light guiding rod, which guides the light entering from the light entering surface 21A21 as an end surface on a base end portion $BE_{21A2}$ side to a distal end portion $FE_{21A2}$ side, and is configured to have a curved shape corresponding to another part of the ring-shaped light emitting surface (see the ring-shaped region indicated by the character EA1 in FIG. 1).

Similarly, the fourth rod-shaped light guiding portion 21B2 guides light which is emitted by a fourth light source (not illustrated), the fourth light source being arranged to be opposed to a light entering surface 21B21 of the fourth rod-shaped light guiding portion 21B2. As illustrated in FIG. 2A and FIG. 2B, the fourth rod-shaped light guiding portion 21B2 is a long light guiding rod, which guides the light entering from the light entering surface 21B21 as an end surface on a base end portion $BE_{21B2}$ side to a distal end portion $FE_{21B2}$ side, and is configured to have a curved shape corresponding to another part of the ring-shaped light emitting surface (see the ring-shaped region indicated by the character EA2 in FIG. 1).

Note that the base end portion $BE_{21A1}$ side of the first rod-shaped light guiding portion 21A1 and the base end portion $BE_{21A2}$ side of the third rod-shaped light guiding portion 21A2 are arranged to be parallelly adjacent to each other and are coupled with each other via a coupling portion 23A (see FIG. 2). Note that the coupling portion 23A is a so-called connection portion which does not have an optical function. Similarly, the base end portion $BE_{21B1}$ side of the second rod-shaped light guiding portion 21B1 and the base end portion $BE_{21B2}$ side of the fourth rod-shaped light guiding portion 21B2 are arranged to be parallelly adjacent to each other and are coupled with each other via a coupling portion 23B (see FIG. 2). Note that the coupling portion 23B is a so-called connection portion which does not have an optical function.

Cross-sectional shapes of the first to fourth rod-shaped light guiding portions 21A1 to 21B2 are similar cross-sectional shapes. In the following, a description will be made about, as a representative, the cross-sectional shape of the first rod-shaped light guiding portion 21A1.

As illustrated in FIG. 3, the cross-sectional shape of the first rod-shaped light guiding portion 21A1 is a circular shape which is linearly symmetric with respect to an optical axis $AX_{21A1}$ of the first rod-shaped light guiding portion 21A1. Specifically, the first rod-shaped light guiding portion 21A1 is a rod-shaped light guiding portion (light guiding rod), which includes a light exiting surface 21A12 and a reflection surface 21A13 on its opposite side and whose cross-sectional shape is a common circular shape. Note that this is not restrictive, and the first rod-shaped light guiding portion 21A1 may be a rod-shaped light guiding portion (light guiding rod) which has another cross-sectional shape than the circular shape, such as a sector shape, for example. Note that the rod-shaped light guiding portion whose cross-sectional shape is a sector shape is disclosed in Japanese Unexamined Patent Application Publication No. 2017-41368, for example.

A cross-sectional shape of the light exiting surface 21A12 is an arc shape which is convexed to a front side (in a light radiation direction).

Meanwhile, a cross-sectional shape of the reflection surface 21A13 is a linear shape which intersects with (orthogonal to) the optical axis $AX_{21A1}$ of the first rod-shaped light guiding portion 21A1.

The reflection surface 21A13 includes an optical element LC1 that is configured to perform internal reflection (total reflection) for light, which is guided in the first rod-shaped light guiding portion 21A1 and is incident on the reflection surface 21A13, and to cause the light to exit from the light exiting surface 21A12. A plurality of above optical elements LC1 are provided in a longitudinal direction of the first rod-shaped light guiding portion 21A1. Black bold lines indicated in the first to fourth rod-shaped light guiding portions 21A1 to 21B2 in FIG. 2B represent ranges where the optical elements LC1 are provided. The optical element LC1 is a lens cut (for example, a V groove), for example.

As illustrated in FIG. 2A and FIG. 2B, the intermediate portion 22 is arranged between the upper-side rod-shaped light guiding portion 21A (the first rod-shaped light guiding portion 21A1) and the lower-side rod-shaped light guiding portion 21B (the second rod-shaped light guiding portion 21B1).

The intermediate portion 22 is coupled with the first rod-shaped light guiding portion 21A1 by a first coupling portion 24A. Specifically, the first coupling portion 24A couples the base end portion $BE_{21A1}$ side (a part of an outer periphery surface) of the first rod-shaped light guiding portion 21A1 with an upper portion of the intermediate portion 22 such that a part of the first light, which enters the first rod-shaped light guiding portion 21A1 through the light entering surface 21A11 of the first rod-shaped light guiding portion 21A1, enters an inside of the intermediate portion 22 via the first coupling portion 24A.

Similarly, the intermediate portion 22 is coupled with the second rod-shaped light guiding portion 21B1 by a second coupling portion 24B. Specifically, the second coupling portion 24B couples the base end portion $BE_{21B1}$ side (a part of an outer periphery surface) of the second rod-shaped light guiding portion 21B1 with a lower portion of the intermediate portion 22 such that a part of the second light, which enters the second rod-shaped light guiding portion 21B1 through the light entering surface 21B11 of the second rod-shaped light guiding portion 21B1, enters the inside of the intermediate portion 22 via the second coupling portion 24B.

As illustrated in FIG. 4, the intermediate portion 22 includes a light exiting surface 22*a* which is arranged on the front side (in the light radiation direction) and reflection surfaces 22*b* which are arranged on an opposite side of the light exiting surface 22*a*.

The light exiting surface 22*a* has a planar shape, for example. The reflection surface 22*b* includes one or a plurality of optical elements that are configured to perform the internal reflection (total reflection) for light, which enters the intermediate portion 22 as described above, and to cause the light to exit from the light exiting surface 22*a*. The optical element is a lens cut (for example, a V groove), for example.

As illustrated in FIG. 1 and FIG. 4, the light guiding body 20 in the above configuration is covered by the first extension 40 in a state where the first to fourth rod-shaped light guiding portions 21A1 to 21B2 (respective light exiting surfaces) and the intermediate portion 22 (light exiting surface) are exposed from through holes formed in the first extension 40. The through hole in the first extension 40, which corresponds to the intermediate portion 22 (light exiting surface), is covered by the second extension 50 in which slit-shaped through holes SL1 and SL2 are formed (see FIG. 4). Engagement portions 51 and 52 of the second extension 50 are engaged with the first extension 40, for example, and the second extension 50 is thereby attached to the first extension 40. The first extension 40 and the second extension 50 are examples of decorative members.

Next, a description will be made about the first light source 30A, the second light source 30B, and so forth. The first light source to the fourth light source are similar light sources. In the following, a description will be made about, as a representative, the first light source 30A.

The first light source 30A is a semiconductor light emitting element such as an LED which emits red light, for example. The first light source 30A includes a light emitting surface (for example, a light emitting surface of a rectangle of 1 mm square). The first light source 30A is arranged to be opposed to the light entering surface 21A11 of the first rod-shaped light guiding portion 21A1 (see FIG. 4).

Similarly, the second light source 30B is arranged to be opposed to the light entering surface 21B11 of the second rod-shaped light guiding portion 21B1 (see FIG. 4). Similarly, although no illustration is provided, the third light source is arranged to be opposed to the light entering surface 21A21 of the third rod-shaped light guiding portion 21A2. Similarly, the fourth light source is arranged to be opposed to the light entering surface 21B21 of the fourth rod-shaped light guiding portion 21B2.

In the vehicular lamp fitting 10 in the above configuration, a tail lamp can be realized by lighting the first light source to the fourth light source.

An optical path of the light emitted by the first light source 30A is as follows. That is, when the first light source 30A is lit, the first light emitted by the first light source 30A enters the first rod-shaped light guiding portion 21A1 through the light entering surface 21A11 of the first rod-shaped light guiding portion 21A1 and is guided to the distal end portion $FE_{21A1}$ side of the first rod-shaped light guiding portion 21A1 while repeating the internal reflection (total reflection) in the first rod-shaped light guiding portion 21A1.

Partial light of the light guided in the first rod-shaped light guiding portion 21A1 is subjected to internal reflection (diffuse reflection) by the reflection surface 21A13 (optical elements LC1) of the first rod-shaped light guiding portion 21A1 and exits from the light exiting surface 21A12 of the first rod-shaped light guiding portion 21A1.

Meanwhile, as illustrated in FIG. 4, light Ray1 as a part of the first light, which enters the first rod-shaped light guiding portion 21A1, enters an inside of the intermediate portion 22 via the first coupling portion 24A, is subjected to the internal reflection (diffuse reflection) by the reflection surface 22*b*, and exits from the light exiting surface 22*a* of the intermediate portion 22.

Similarly, an optical path of the light emitted by the second light source 30B is as follows. That is, when the second light source 30B is lit, the second light emitted by the second light source 30B enters the second rod-shaped light guiding portion 21B1 through the light entering surface 21B11 of the second rod-shaped light guiding portion 21B1 and is guided to the distal end portion $FE_{21B1}$ side of the second rod-shaped light guiding portion 21B1 while repeating the internal reflection (total reflection) in the second rod-shaped light guiding portion 21B1.

Partial light of the light guided in the second rod-shaped light guiding portion 21B1 is subjected to the internal reflection (diffuse reflection) by the reflection surface 21B13 (optical elements LC1) of the second rod-shaped light guiding portion 21B1 and exits from the light exiting surface 21B12 of the second rod-shaped light guiding portion 21B1. Meanwhile, as illustrated in FIG. 4, light Ray2 as a part of the second light, which enters the second rod-shaped light guiding portion 21B1, enters the inside of the intermediate portion 22 via the second coupling portion 24B, is subjected to the internal reflection (diffuse reflection) by the reflection surface 22*b*, and exits from the light exiting surface 22*a* of the intermediate portion 22.

Similarly, an optical path of the light emitted by the third light source (not illustrated) is as follows. That is, when the third light source is lit, the light emitted by the third light source enters the third rod-shaped light guiding portion 21A2 through the light entering surface 21A21 of the third rod-shaped light guiding portion 21A2 and is guided to the distal end portion $FE_{21A2}$ side of the third rod-shaped light guiding portion 21A2 while repeating the internal reflection (total reflection) in the third rod-shaped light guiding portion 21A2.

Partial light of the light guided in the third rod-shaped light guiding portion 21A2 is subjected to the internal reflection (diffuse reflection) by a reflection surface 21A23 (optical elements LC1) of the third rod-shaped light guiding portion 21A2 and exits from a light exiting surface 21A22 of the third rod-shaped light guiding portion 21A2.

Similarly, an optical path of the light emitted by the fourth light source (not illustrated) is as follows. That is, when the fourth light source is lit, the light emitted by the fourth light source enters the fourth rod-shaped light guiding portion 21B2 through the light entering surface 21B21 of the fourth rod-shaped light guiding portion 21B2 and is guided to the distal end portion $FE_{21B2}$ side of the fourth rod-shaped light guiding portion 21B2 while repeating the internal reflection (total reflection) in the fourth rod-shaped light guiding portion 21B2.

Partial light of the light guided in the fourth rod-shaped light guiding portion 21B2 is subjected to the internal reflection (diffuse reflection) by a reflection surface 21B23 (optical elements LC1) of the fourth rod-shaped light guiding portion 21B2 and exits from a light exiting surface 21B22 of the fourth rod-shaped light guiding portion 21B2. As described above, the light, which is guided by the rod-shaped light guiding portions 21 (first to fourth rod-shaped light guiding portions 21A1 to 21B2), exit from the respective light exiting surfaces of the rod-shaped light guiding portions 21 (first to fourth rod-shaped light guiding portions 21A1 to 21B2), and the rod-shaped light guiding portions 21 thereby emit light.

The light exiting from the light exiting surface 22*a* of the intermediate portion 22 is reflected by a reflection surface (one example of a light guiding portion of the present disclosure, see FIG. 4) as a part of the first extension 40, is thereby guided to the slit-shaped through holes SL1 and SL2 formed in the second extension 50, passes through the slit-shaped through holes SL1 and SL2, and is radiated to vehicle rear. In this case, the light passing through the slit-shaped through holes SL1 and SL2 causes the slit-shaped through holes SL1 and SL2 to emit light.

Accordingly, as illustrated in FIG. 1, even in a case where a distance L1 between the upper-side rod-shaped light guiding portion 21A and the lower-side rod-shaped light guiding portion 21B exceeds 75 mm, distances L2 and L3 between light emitting surfaces can be set to 75 mm or less, and a single-lamp requirement (the distance between the light emitting surfaces is 75 mm or less) which is provided by laws can thus be satisfied.

Note that a character L1 in FIG. 1 represents the distance between a light emitting surface of the upper-side rod-shaped light guiding portion 21A and a light emitting surface of the lower-side rod-shaped light guiding portion 21B. The light guided by the upper-side rod-shaped light guiding portion 21A (first and third rod-shaped light guiding portions 21A1 and 21A2) exits from the light exiting surfaces of the upper-side rod-shaped light guiding portion 21A (first and third rod-shaped light guiding portions 21A1 and 21A2), and the light emitting surface of the upper-side rod-shaped light guiding portion 21A is thereby formed. The light guided by the lower-side rod-shaped light guiding portion 21B (second and fourth rod-shaped light guiding portions 21B1 and 21B2) exits from the light exiting surfaces of the lower-side rod-shaped light guiding portion 21B (second and fourth rod-shaped light guiding portions 21B1 and 21B2), and the light emitting surface of the lower-side rod-shaped light guiding portion 21B is thereby formed.

Meanwhile, a character L2 in FIG. 1 represents the distance between the light emitting surface of the upper-side rod-shaped light guiding portion 21A and a light emitting surface formed by passage of light through the slit-shaped through holes SL1 and SL2. The light guided by the upper-side rod-shaped light guiding portion 21A (first and third rod-shaped light guiding portions 21A1 and 21A2) exits from the light exiting surfaces of the upper-side rod-shaped light guiding portion 21A (first and third rod-shaped light guiding portions 21A1 and 21A2), and the light emitting surface of the upper-side rod-shaped light guiding portion 21A is thereby formed. The light exiting from the light exiting surface 22*a* of the intermediate portion 22 passes through the slit-shaped through holes SL1 and SL2 which are formed in the second extension 50, and the light emitting surface formed by passage of light through the slit-shaped through holes SL1 and SL2 is thereby formed.

A character L3 in FIG. 1 represents the distance between the light emitting surface of the lower-side rod-shaped light guiding portion 21B and the light emitting surface formed by passage of light through the slit-shaped through holes SL1 and SL2. The light guided by the lower-side rod-shaped light guiding portion 21B (second and fourth rod-shaped light guiding portions 21B1 and 21B2) exits from the light exiting surfaces of the lower-side rod-shaped light guiding portion 21B (second and fourth rod-shaped light guiding portions 21B1 and 21B2), and the light emitting surface of the lower-side rod-shaped light guiding portion 21B is thereby formed. The light exiting from the light exiting surface 22*a* of the intermediate portion 22 passes through the slit-shaped through holes SL1 and SL2 which are formed in the second extension 50, and the light emitting surface formed by passage of light through the slit-shaped through holes SL1 and SL2 is thereby formed.

As described above, in the present embodiment, the single-lamp requirement (the distance between the light emitting surfaces is 75 mm or less) which is provided by laws can be satisfied.

This is because the intermediate portion 22 forming the light emitting surface is arranged between the upper-side rod-shaped light guiding portion 21A (first rod-shaped light guiding portion 21A1) and the lower-side rod-shaped light guiding portion 21B (second rod-shaped light guiding portion 21B1).

In the present embodiment, as described above, because the upper-side rod-shaped light guiding portion 21A (first rod-shaped light guiding portion 21A1) and the lower-side rod-shaped light guiding portion 21B (second rod-shaped light guiding portion 21B1) can be coupled with each other by the intermediate portion 22, that is, because the plurality of rod-shaped light guiding portions can be integrated, costs can be reduced.

In the present embodiment, the first to fourth light sources are arranged to be adjoining each other, and as a result, because the plurality of light sources can be installed in the same substrate, costs can be reduced.

In the present embodiment, because the respective base end portions (light entering portions) of the first to fourth rod-shaped light guiding portions 21A1 to 21B2 can be arranged to be adjoining each other, it becomes possible to save space.

In the present embodiment, there is an advantage in which a dedicated light source for causing the intermediate portion 22 to emit light is not necessary. Accordingly, the single-lamp requirement (the distance between the light emitting surfaces is 75 mm or less) which is provided by laws (for example, European laws) can be satisfied without impairing designability.

Next, modifications will be described.

In the above embodiment, a description is made about an example where the first to fourth rod-shaped light guiding portions 21A1 to 21B2 are arranged symmetrically in an up-down direction, but this is not restrictive. For example, the first to fourth rod-shaped light guiding portions 21A1 to 21B2 may be arranged asymmetrically in the up-down direction, may be arranged symmetrically in a left-right direction, or may be arranged in various forms.

In the above embodiment, a description is made about an example where the first to fourth rod-shaped light guiding portions 21A1 to 21B2 having curved shapes are used as illustrated in FIG. 2, but this is not restrictive, and the first to fourth rod-shaped light guiding portions 21A1 to 21B2 may be curved into various shapes. For example, the first to fourth rod-shaped light guiding portions 21A1 to 21B2 may be curved two-dimensionally or may be curved three-dimensionally. The first to fourth rod-shaped light guiding portions 21A1 to 21B2 do not have to be curved but may have linear shapes.

In the above embodiment, a description is made about an example where as the upper-side rod-shaped light guiding portion 21A, the first rod-shaped light guiding portion 21A1 and the third rod-shaped light guiding portion 21A2 are used, but this is not restrictive. For example, as the upper-side rod-shaped light guiding portion 21A, only the first rod-shaped light guiding portion 21A1 may be used while the third rod-shaped light guiding portion 21A2 is omitted. As the upper-side rod-shaped light guiding portion 21A, three or more rod-shaped light guiding portions may be used by adding the rod-shaped light guiding portion to the first rod-shaped light guiding portion 21A1 and the third rod-shaped light guiding portion 21A2.

Similarly, in the above embodiment, a description is made about an example where as the lower-side rod-shaped light guiding portion 21B, the second rod-shaped light guiding portion 21B1 and the fourth rod-shaped light guiding portion 21B2 are used, but this is not restrictive. For example, as the lower-side rod-shaped light guiding portion 21B, only the second rod-shaped light guiding portion 21B1 may be used while the fourth rod-shaped light guiding portion 21B2 is omitted. As the lower-side rod-shaped light guiding portion 21B, three or more rod-shaped light guiding portions may be used by adding the rod-shaped light guiding portion to the second rod-shaped light guiding portion 21B1 and the fourth rod-shaped light guiding portion 21B2.

All numerical values indicated in the above embodiment are examples, and it goes without saying that appropriate numerical values different from those can be used.

The above embodiment is only an example in all respects. The present disclosure is not restrictively interpreted based on the descriptions about the above embodiment. The present disclosure can be carried out in various other forms without departing from the spirit and scope or the main features thereof.

What is claimed is:

1. A vehicular lamp fitting comprising:

a light guiding body;

a first light source; and a second light source, wherein the light guiding body includes a first rod-shaped light guiding portion which guides first light emitted by the first light source, a second rod-shaped light guiding portion which guides second light emitted by the second light source, an intermediate portion which is arranged between the first rod-shaped light guiding portion and the second rod-shaped light guiding portion, a first coupling portion which couples a base end portion side of the first rod-shaped light guiding portion and the intermediate portion together such that a part of the first light, which enters the first rod-shaped light guiding portion through a light entering surface of the first rod-shaped light guiding portion, enters an inside of the intermediate portion, and a second coupling portion which couples a base end portion side of the second rod-shaped light guiding portion and the intermediate portion together such that a part of the second light, which enters the second rod-shaped light guiding portion through a light entering surface of the second rod-shaped light guiding portion, enters the inside of the intermediate portion, a decorative member in which a slit-shaped through hole, through which light exiting from the light exiting surface of the intermediate portion passes, is formed, a light guiding portion which is arranged between the light exiting surface of the intermediate portion and the slit-shaped through hole and which guides the light exiting from the light exiting surface of the intermediate portion to the slit-shaped through hole, and the intermediate portion includes a light exiting surface from which the first light and the second light, which enter the inside of the intermediate portion, exit.

2. The vehicular lamp fitting according to claim 1, wherein the light guiding body includes a third rod-shaped light guiding portion that has a base end portion and a distal end portion, and the base end portion side of the first rod-shaped light guiding portion and the base end portion side of the third rod-shaped light guiding portion are coupled with each other via a coupling portion.

3. The vehicular lamp fitting according to claim 2, wherein the light guiding body includes a fourth rod-shaped light guiding portion that has a base end portion and a distal end portion, and the base end portion side of the second rod-shaped light guiding portion and the base end portion side of the fourth rod-shaped light guiding portion are coupled with each other via a coupling portion.

4. The vehicular lamp fitting according to claim 3, wherein the first rod-shaped light guiding portion includes a first light emitting surface from which the first light, which is guided by the first rod-shaped light guiding portion, exit, the second rod-shaped light guiding portion includes a second light emitting surface from which the second light, which is guided by the second rod-shaped light guiding portion, exit, the third rod-shaped light guiding portion includes a third light emitting surface from which light, which is guided by the third rod-shaped light guiding portion, exit, the fourth rod-shaped light guiding portion includes a fourth light emitting surface from which light, which is guided by the fourth rod-shaped light guiding portion, exit, a distance between the first light emitting surface and the second light emitting surface, a distance between the first light emitting surface and the fourth light emitting surface, a distance between the third light emitting surface and the second light emitting surface, and a distance between the third light emitting surface and the fourth light emitting surface exceed 75 mm, and a distance between the first light emitting surface or the third light emitting surface and the light exiting surface of the intermediate portion is set 75 mm or less, and a distance between the second light emitting surface or the fourth light emitting surface and the light exiting surface of the intermediate portion is set 75 mm or less.

5. The vehicular lamp fitting according to claim 4, further comprising a third light source, and a fourth light source, wherein the third rod-shaped light guiding portion includes a light entering surface on which light from the third light source enters the third rod-shaped light guiding portion, and the fourth rod-shaped light guiding portion includes a light entering surface on which light from the fourth light source enters the fourth rod-shaped light guiding portion.

6. The vehicular lamp fitting according to claim 2, wherein the first rod-shaped light guiding portion includes a first light emitting surface from which the first light, which is guided by the first rod-shaped light guiding portion, exit, the second rod-shaped light guiding portion includes a second light emitting surface from which the second light, which is guided by the second rod-shaped light guiding portion, exit, the third rod-shaped light guiding portion includes a third light emitting surface from which light, which is guided by the third rod-shaped light guiding portion, exit, a distance between the first light emitting surface and the second light emitting surface, and a distance between the third light emitting surface and the second light emitting surface exceed 75 mm, and a distance between the first light emitting surface or the third light emitting surface and the light exiting surface of the intermediate portion is set 75 mm or less, and a distance between the second light emitting surface and the light exiting surface of the intermediate portion is set 75 mm or less.

7. The vehicular lamp fitting according to claim 6, further comprising a third light source, wherein the third rod-shaped light guiding portion includes a light entering surface on which light from the third light source enters the third rod-shaped light guiding portion.

8. The vehicular lamp fitting according to claim 1, wherein the first rod-shaped light guiding portion includes a first light emitting surface from which the first light, which is guided by the first rod-shaped light guiding portion, exit, the second rod-shaped light guiding portion includes a second light emitting surface from which the second light, which is guided by the second rod-shaped light guiding portion, exit, a distance between the first light emitting surface and the second light emitting surface exceeds 75 mm, and a distance between the first light emitting surface and the light exiting surface of the intermediate portion is set 75 mm or less, and a distance between the second light emitting surface and the light exiting surface of the intermediate portion is set 75 mm or less.

* * * * *